N. E. STENBERG.
BOND CONNECTION OR INTERLOCK FOR DEAL HOUSES.
APPLICATION FILED DEC. 27, 1919.
1,334,121.
Patented Mar. 16, 1920.
2 SHEETS—SHEET 1.
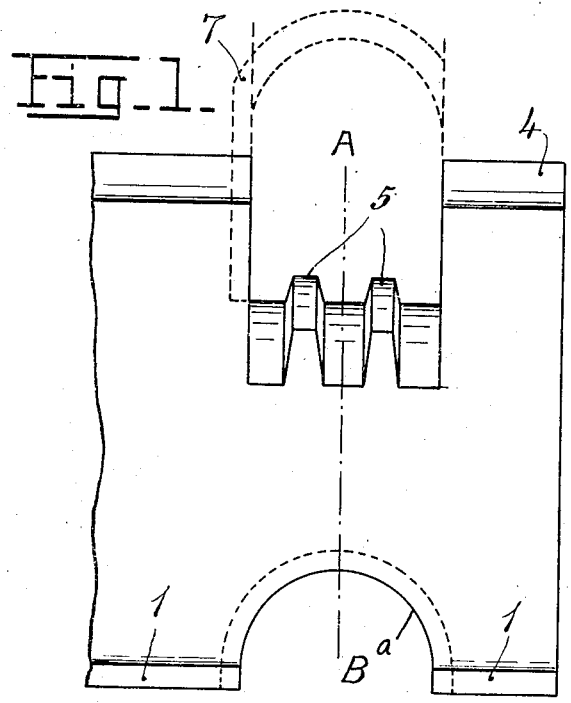
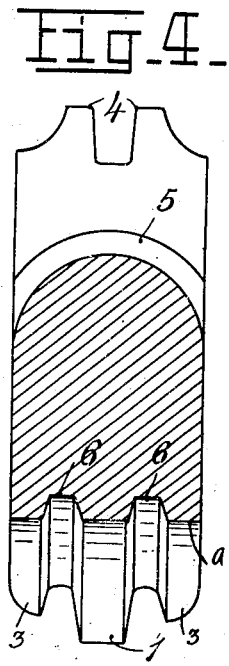
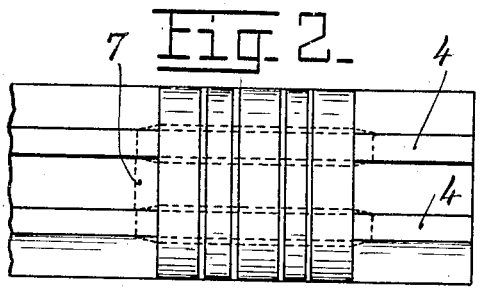
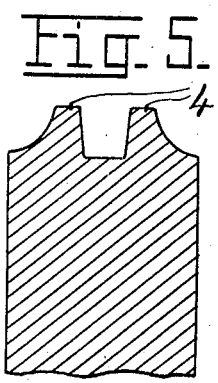
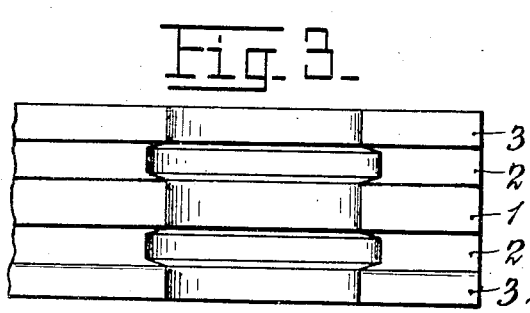
Inventor
Nils Evensen Stenberg.
By Henry Orth atty.

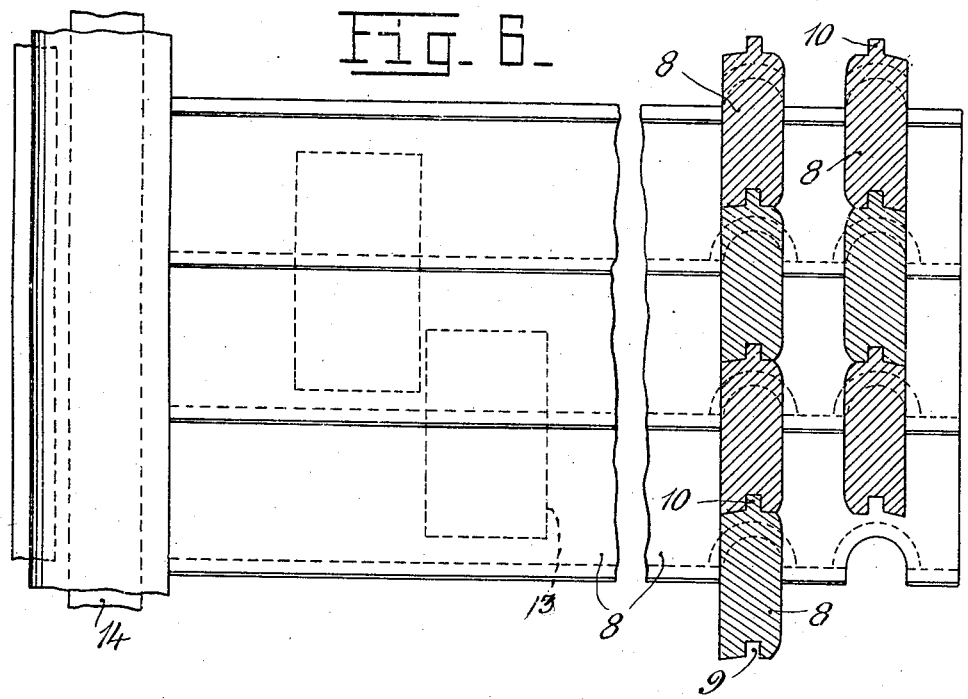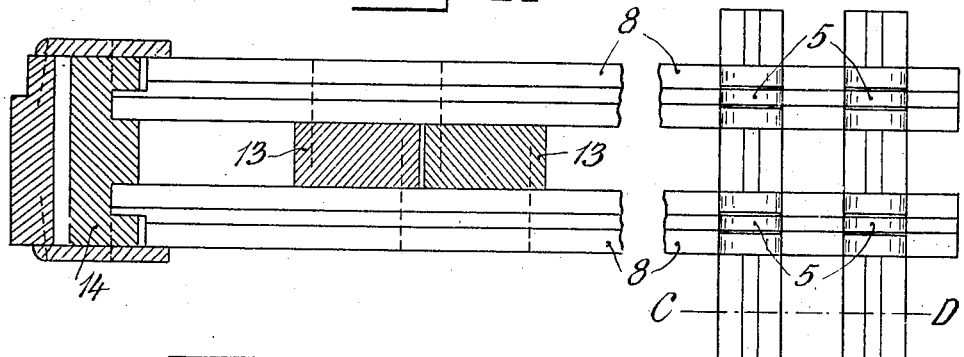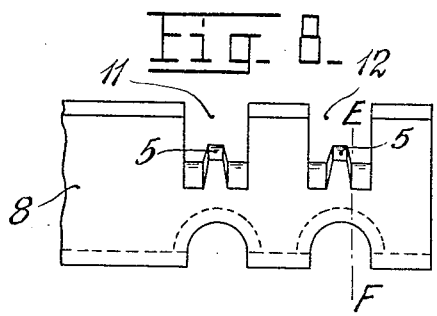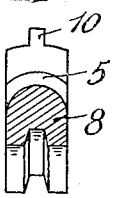

# UNITED STATES PATENT OFFICE.

NILS EVENSEN STENBERG, OF ILSENG STATION, NORWAY.

BOND CONNECTION OR INTERLOCK FOR DEAL HOUSES.

1,334,121.  Specification of Letters Patent.  Patented Mar. 16, 1920.

Application filed December 27, 1919. Serial No. 347,870.

*To all whom it may concern:*

Be it known that I, NILS EVENSEN STENBERG, a subject of the King of Norway, residing at Ilseng Station, Norway, have invented certain new and useful Improvements in Bond Connections or Interlocks for Deal Houses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Bonds for wooden deal or plank houses have hitherto been made mainly by hand tools, this mode of operation making the bond connection inaccurate and expensive, and therefore unfit for modern use.

The object of this invention is to provide a novel bond connection that is tight and reliable and easily machine made.

Two executional forms of the invention are by way of example illustrated in the accompanying drawings, in which:

Figures 1 and 2 are, respectively, a side view and top view of the end of a deal or plank, provided with bonds or notches for the corners of a house, and Fig. 3 illustrates the same, seen from below. Fig. 4 is a sectional view on line A—B, Fig. 1, and Fig. 5 is a sectional view of the upper edge of a deal or plank.

Fig. 6 is a side view, partly in section on line C—D, Fig. 7, of a bond connection for deals with a single groove and tongue, and illustrating also a novel kind of double bond walls, especially adapted for thin deals or planks. Fig. 7 is a corresponding top view of a layer of deals in a house corner, with parts in section. Fig. 8 is a side view of a corresponding deal or plank, and Fig. 9 is a section on line E—F, Fig. 8.

In the form shown in Figs. 1 to 5 the deals or planks are in well known way provided with double grooves and tongues along their lower and upper edges respectively, said grooves and tongues being preferably wedge-shaped in order to secure a tight fit. The middle tongue 1 between the grooves 2 is preferably made somewhat higher and broader than the side tongues 3, 3 interlocking or matching with the tongues 4, 4 on the edge of the adjoining deal or plank.

Now according to this invention the bond or corner connection is provided by aid of notches having semicircular or otherwise curved bottoms cut out by machine, said notches being provided with cams or convex tongues 5, 5, corresponding to the double grooves 2 of the deal edges, and grooves, corresponding to their tongues 1 and 3. As shown in the drawings these cams or convex tongues 5, 5 are also wedge-shaped, the same being the case with the corresponding grooves 6, 6, in the semicircular recesses $a$ into which they fit and formed in the bottom edges of the deals.

In order to prevent the formation of a crevice or opening through which the air might pass through the bond connection or interlock, there may suitably be driven in a small loose wedge 7 or filler piece (shown in broken lines in Figs. 1 and 2), in order to have the groove in the upper edge of the plank tightened up.

This bond connection or interlock, which as mentioned is easily cut in a cutting or grooving machine is especially designed for ready made, detachable deal houses and buildings, barracks and the like, but may of course also be used for other purposes.

Hitherto it has been considered impracticable to use bonding connections for deals or planks of less thickness than 3 inches or so. The cheap and accurate cutting of the semicircular or otherwise curved bonds according to this invention enables also using this kind of corner connection for deals of less width.

Figs. 6 to 9 illustrate a bonding connection for deals or planks two inches more or less in thickness wherein is used a novel kind of double bond with insulating air space between the two walls of planks, making it especially serviceable for severe climates.

The thin deals or planks 8 which as usual are provided with single groove 9 and tongue 10, are at the ends provided with two bond cuts 11 and 12 spaced apart a distance corresponding to the width of the air space desired between the two walls, which may suitably correspond to the width of the planks. The planks or deals are then put together to form the connection illustrated in Figs. 6 and 7 thereby forming a double bond in the corner inclosing a hollow space of quadratic cross section.

The bond notches differ from those in Figs. 1 to 5 only therein that there is only one cam or tongue 5.

As indicated in Fig. 6 the deals are preferably laid with their best or planed sides outward and their rough sides inward into the air space. In order to keep the two walls properly spaced and parallel outside the corners there may suitably be placed short deal pieces or spacing blocks 13 in the air space, fastened with nails to both walls, but in such a way as to not interfere with the interfitting of the tongues and grooves.

To the left in Figs. 6 and 7 is shown the connection between the two plank or deal walls and a window or door frame 14.

The air space between the two walls may eventually be filled with a suitable insulating material as wood shavings or the like.

The invention is not limited to the use of the circular bond cuts or notches shown, it being evident that also notches formed in other curves suitable for machine cutting may be used. Although the use of the cams or tongues 5 is to be preferred for providing an airtight fit they may also eventually be dispensed with.

I claim:

1. Interlocking deals whose edges have interfitting notches transverse of the deals and whose bottoms are respectively concave and convex.

2. Interlocking deals whose edges have interfitting notches transverse of the deals and whose bottoms are respectively concave and convex, the concave bottoms having one or more grooves and the convex bottoms having one or more tongues.

3. Interlocking deals the edges of which have interfitting notches transverse of the deals and whose bottoms are respectively concave and convex semi-circular surfaces.

4. Interlocking deals whose edges have interfitting notches transverse of the deals, and whose bottoms are respectively concave and convex semi-circular surfaces, the concave bottoms having one or more parallel grooves and the convex bottoms having one or more parallel tongues matching the grooves in said concave bottoms.

5. Interlocking deals, each edge of a deal having one or more notches spaced apart and transverse of the deal, the bottoms of said notches at opposite edges being respectively concave and convex, thereby facilitating the forming of hollow walls.

6. Interlocking deals, each edge of a deal having one or more notches spaced apart and transverse of the deal, the bottoms of said notches at opposite edges being respectively concave and convex, thereby facilitating the formation of hollow walls, the spaces between the notches on an edge being at least equal to the thickness of the deal.

7. Interlocking deals, each edge of a deal having one or more notches spaced apart and transverse of the deal, the bottoms of said notches at opposite edges being respectively concave and convex, thereby facilitating the formation of hollow walls, the spaces between the notches on an edge being at least equal to the thickness of the deal, and spacing blocks nailed to the sides of the deals adjacent to the notched portions.

In testimony that I claim the foregoing as my invention, I have signed my name in presence of two subscribing witnesses.

NILS EVENSEN STENBERG.

Witnesses:
  E. S. HENDRICKSEN,
  NATH. A. HEDENSCON.